(12) United States Patent
May

(10) Patent No.: US 11,371,242 B2
(45) Date of Patent: *Jun. 28, 2022

(54) MACHINE WALLS

(71) Applicant: Joshua May, San Diego, CA (US)

(72) Inventor: Joshua May, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/168,890

(22) Filed: Feb. 5, 2021

(65) Prior Publication Data

US 2021/0246652 A1 Aug. 12, 2021

Related U.S. Application Data

(60) Provisional application No. 62/980,420, filed on Feb. 23, 2020, provisional application No. 62/971,366, filed on Feb. 7, 2020.

(51) Int. Cl.

| | |
|---|---|
| *E04B 2/60* | (2006.01) |
| *H02G 3/38* | (2006.01) |
| *E04B 1/41* | (2006.01) |
| *H01R 35/04* | (2006.01) |
| *H01R 13/08* | (2006.01) |
| *H02G 3/04* | (2006.01) |

(Continued)

(52) U.S. Cl.
CPC .............. *E04B 2/60* (2013.01); *E04B 1/02* (2013.01); *E04B 1/4114* (2013.01); *H01R 13/08* (2013.01); *H01R 35/04* (2013.01); *H02G 3/04* (2013.01); *H02G 3/386* (2013.01); *E04B 2001/2463* (2013.01)

(58) Field of Classification Search
CPC ........ E04B 1/02; E04B 1/4114; E04B 2/7425; E04B 2/60; E04B 2001/2463; E04B 2002/7488; E04C 2/46; E04C 2/384; E04C 2/386; E04C 2/388; E04C 2/526; E04H 9/021; E04H 9/027; E04H 12/2269; H01R 13/08; H01R 35/04; H01R 25/006; H02G 3/386; H02G 3/388; H02G 3/04
USPC .................................................... 52/274, 298
See application file for complete search history.

(56) References Cited

U.S. PATENT DOCUMENTS 3,641,720 A * 2/1972 Berrie ................... B32B 15/046
 52/126.4
3,952,461 A 4/1976 Kinsey
(Continued)

FOREIGN PATENT DOCUMENTS

WO WO-0032946 A1 * 6/2000 ........... E21D 21/008

*Primary Examiner* — Jessie T Fonseca
(74) *Attorney, Agent, or Firm* — Kirk A. Buhler; Buhler & Associates Patenting

(57) ABSTRACT

Improvements in machine walls to construct a building or house is disclosed. Adjacent side of the wall sections are tapered and dovetailed that lock-in-place. The dovetails are spaced to reduce the height that one section must be lifted to engage in an adjoining wall section. The footers/base plate will also have integrated earthquake or hurricane holddowns in the footer/base plate that aligns and can be secured from the foundation to the wall sections. The connection of the wall section to the foundation to have counter flashing at the concrete insert and the wall-to-wall sections can be self-flashed. The wall sections can have GPS locators for positioning the wall sections. Plumbing and electrical conduit creating circuits that can be integrated into the walls and are connected sealed or bonded together.

18 Claims, 11 Drawing Sheets

(51) Int. Cl.
  *E04B 1/02* (2006.01)
  *E04B 1/24* (2006.01)

(56) References Cited

U.S. PATENT DOCUMENTS

| | | | |
|---|---|---|---|
| 3,992,834 A | | 11/1976 | Valenzano |
| 4,056,297 A | * | 11/1977 | Gartung ............... H01R 25/162 |
| | | | 439/215 |
| 4,060,294 A | | 11/1977 | Haworth et al. |
| 4,214,799 A | * | 7/1980 | Biche ..................... H01R 35/04 |
| | | | 174/505 |
| 4,276,730 A | | 7/1981 | Lewis |
| 4,370,008 A | * | 1/1983 | Haworth ............... E04B 2/7425 |
| | | | 439/165 |
| 4,653,239 A | | 3/1987 | Randa |
| 4,896,469 A | | 1/1990 | Wright |
| 5,035,636 A | * | 7/1991 | Hollingsworth ..... H01R 13/642 |
| | | | 439/215 |
| 5,096,433 A | * | 3/1992 | Boundy ................. H02G 3/288 |
| | | | 439/215 |
| 5,471,804 A | | 12/1995 | Winter, IV |
| 5,491,947 A | | 2/1996 | Kim |
| 5,634,315 A | | 6/1997 | Toya |
| 5,657,597 A | | 8/1997 | Loftus |
| 5,697,196 A | | 12/1997 | SalahUddin |
| 5,890,332 A | | 4/1999 | Skidmore et al. |
| 6,256,960 B1 | | 7/2001 | Babcock et al. |
| 6,308,465 B1 | | 10/2001 | Galloway et al. |
| 6,457,281 B1 | | 10/2002 | Teron |
| 6,812,402 B1 | | 11/2004 | Amerson et al. |
| 7,062,885 B1 | | 6/2006 | Dickenson, Jr. |
| 7,690,170 B2 | | 4/2010 | Biffis et al. |
| 8,011,161 B2 | | 9/2011 | Biffis et al. |
| 8,176,696 B2 | | 5/2012 | LeBlang |
| 8,215,065 B2 | | 7/2012 | Gallant |
| 8,763,331 B2 | | 7/2014 | LeBlang |
| 8,978,324 B2 | | 3/2015 | Collins et al. |
| 9,010,054 B2 | | 4/2015 | Herdt et al. |
| 9,200,447 B1 | | 12/2015 | Bargh |
| 9,455,561 B2 | * | 9/2016 | Welch .................... H02G 3/386 |
| 9,493,940 B2 | | 11/2016 | Collins et al. |
| 10,221,568 B2 | | 3/2019 | Ljubicic Rubio |
| 10,273,687 B1 | * | 4/2019 | Walker ................. H01R 25/162 |
| 10,378,204 B2 | | 8/2019 | Gosain |
| 10,538,905 B2 | | 1/2020 | Pirrung |
| 2005/0188632 A1 | | 9/2005 | Rosen |
| 2006/0179739 A1 | | 8/2006 | Lubkert |
| 2015/0204649 A1 | * | 7/2015 | McFarthing ............ G01S 19/48 |
| | | | 702/150 |
| 2017/0342705 A1 | | 11/2017 | Espinosa |

* cited by examiner

MACHINE WALLS

CROSS REFERENCE TO RELATED APPLICATIONS

This application claims the benefit of Provisional Application Ser. No. 62/971,366 filed Feb. 7, 2020 and Provisional Application Ser. No. 62/980,420 filed Feb. 23, 2020 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in building construction. More particularly, the present modular walls used to construct a building creates a method to quickly assemble a building on a foundation.

Description of Related Art Including Information Disclosed Under 37 CFR 1.97 and 1.98

The construction of buildings has progressed from caves to more modern construction, but the need to construct more efficiently and more rapidly continues to be a high priority. After a foundation is poured and set most methods of construction include cutting and securing 2x4 lumber at 16 inches on-center and then drilling holes in the lumber to accommodate electrical and plumbing connections. The plumbing and electrical wiring is then placed though the holes to make the connections. Both the cutting and nailing of the studs along with the wiring and plumbing is very labor intensive and adds a great deal of cost and time to time to construct a building or house. While some houses are custom built, the majority of houses are similar. There is a need to pre-fab some house walls so they can be quickly connected and secured to both accelerate the construction process and reduce the overall cost of the construction.

A number of patents and or publications have been made to address these issues. Exemplary examples of patents and or publication that try to address this/these problem(s) are identified and discussed below.

U.S. Pat. No. 5,634,315 issued on Jun. 3, 1997 to Kiyomi Toya and is titled Building Method of Construction. This patent discloses constructing a building by forming a foundation on a ground surface, positioning a plurality of upright supports to project upwardly from the foundation and securing cladding panels to said upright supports to extend upwardly from the foundation, positioning a plurality of preformed composite assemblies each having a pair of composite boards and forming a building by utilizing the plurality of preformed composite assemblies disposed adjacent to each other for forming the walls, the floor and the ceiling of the building. This is a typical construction method and does not include pre-fabricated wall section with installed plumbing and electrical conduit.

U.S. Pat. No. 6,256,960 issued on Jul. 10, 2001 to Frank J. Babcock et al., and is titled Modular Building Construction and Components Thereof. This patent discloses a modular building construction and components thereof. A foundation for a building includes anchor bolts extending around its periphery. A metal lower track is installed over the anchor bolts and secured thereto with nuts and rod couplers. Elongated connector rods are threaded onto the upper ends of the couplers. Pre-manufactured modular wall panels, integrally molded with a metal stud along a first lateral edge and a complementary recess along a second lateral edge, are successively installed in the track. A first panel is installed with an open side of the stud surrounding the connector rod. The second, adjacent panel is installed with its second lateral edge facing the stud. The two panels are slid together to surround and enclose the connector rod. In this patent electricity and plumbing is installed by removing the wall skin.

U.S. Pat. No. 7,062,885 issued on Jun. 20, 2006 to George H. Dickenson Jr. and is titled Foundation Wall, Construction Kit and Method. This patent discloses a kit is generally comprised of prefabricated modular components and hardware, which can be used for easily and efficiently constructing a foundation for a moderately sized building such as a house. In another aspect, the present invention kit can be seen as embodying a variety of optional modular components that can be used for constructing steps, landings, and/or decks. While this kit is for home construction, it is limited to exterior walls where there is no electrical or plumbing.

What is needed is a pre-fabricated wall section(s) that can be quickly joined together to build a building or house. The pre-fabricated wall sections should also include plumbing and electrical connections. The proposed machine walls provide the solution.

BRIEF SUMMARY OF THE INVENTION

It is an object of the machine walls to have sides that are tapered and dovetailed. The dovetails are spaced per structural requirements to reduce the height that one section must be lifted to engage in an adjoining wall section. The taper provides a loose fit when the dovetail starts to enter the dovetail slot and a tight secure engagement as the dovetail tapers at the bottom.

It is another object of the machine walls to have earthquake or hurricane hold-downs in the footer or bottom plate that aligns and can be secured from the foundation to the wall sections. These hold-downs can be spaced according to the building code of the area where the building or house is being constructed.

It is another object of the machine walls for the modular walls to have a lock-in-place feature whereby there is no secondary tools to fasten the wall sections together. The locks can be integrated in the side dovetails and be spring loaded or one-way engagement to quickly lock and secure the modular walls. The installation and locking of the modular walls can be performed without tools other than lifting hoists on unwieldy sections.

It is another object of the machine walls for the connection of the wall section to the foundation to have counter flashing at the concrete insert. This prevents water intrusion into the wall section or from under the modular wall. The counter flashing can extend slightly up the side of the modular wall and also provides flashing at the vertical intersection of each wall.

It is another object of the machine walls to include a global position sensor (GPS) or similar technology connected to the foundation sleeve so the location and position of each modular wall can be quickly located and placed without requiring an installer to refer to plans as they assembly the building.

It is still another object of the machine walls for the modular wall section to have integrated electrical wires (creating a circuit pathway) and/or plumbing piping or conduit. This will minimize the installation for secondary manual operations and the location for electrical and plumbing fixtures can be pre-located along a wall. The actuating in-wall electrical circuits mechanism may include an internal release that actuates the mechanism when the machine wall panel locks into place that automatically releases the actuation electrical connectors which create the electrical circuit.

It is still another object of the machine walls for the electrical and/or plumbing connections that join modular walls to be connected and sealed with bonding agents, push, spin lock or frictional lock to provide a secure sealed system/pathway for these utilities where the installer can quickly make connections between the modular walls.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 15:
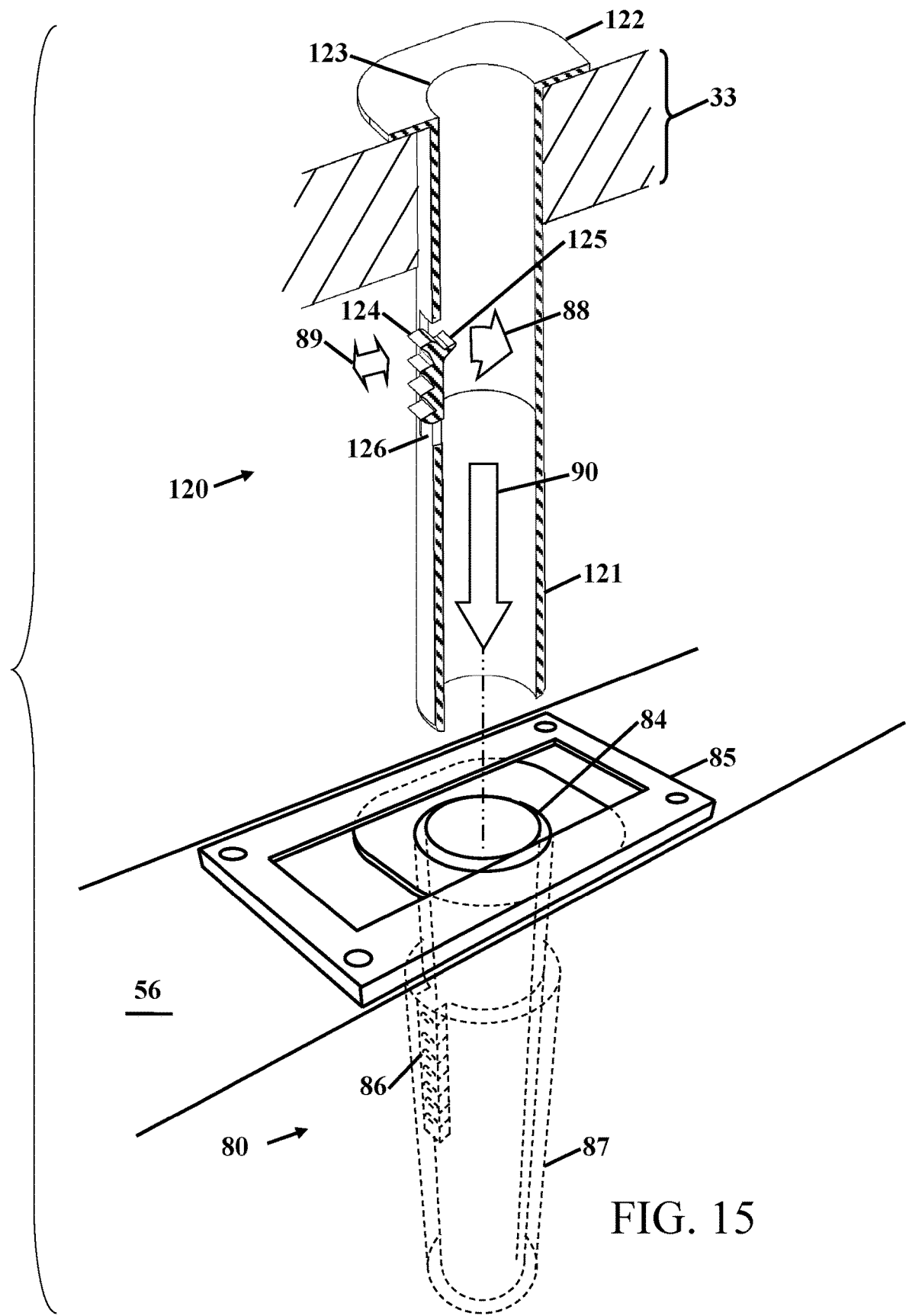

FIG. 15 a perspective view of the one-way anchoring system with both the male post and the female receiver connections.

Figure 16:
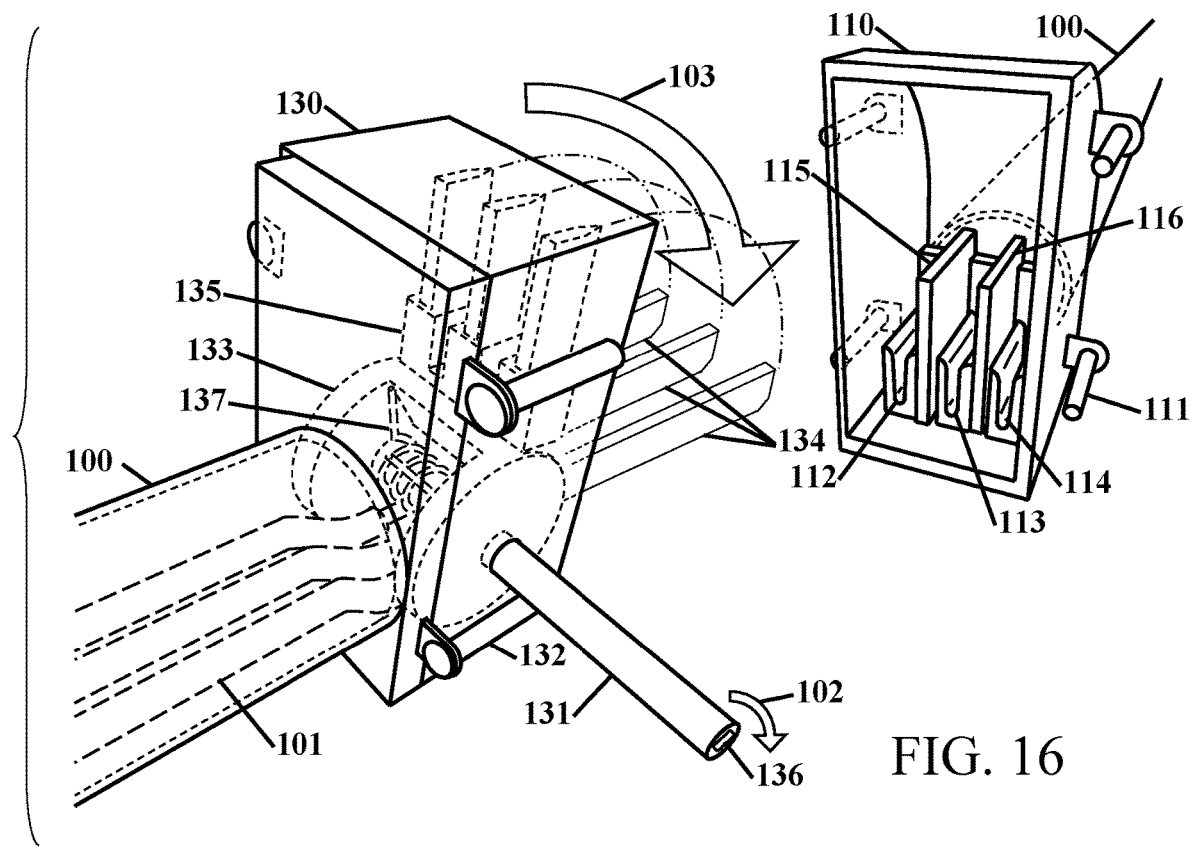

FIG. 16 shows a perspective view of both wall connections for the electrical connections between two machine walls.

Figure 17:
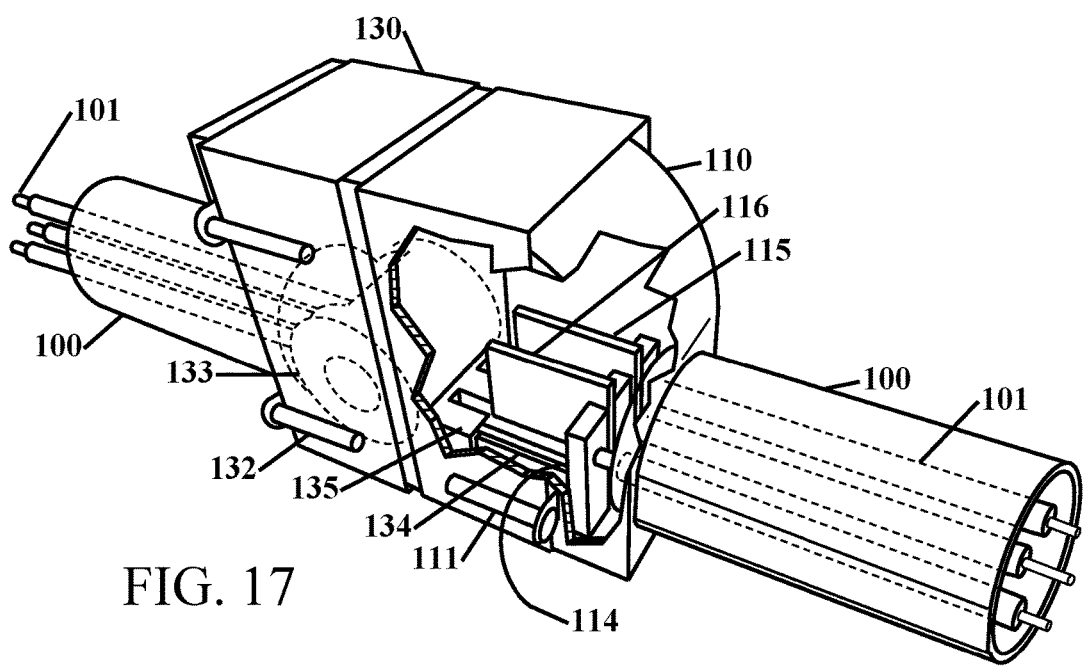

FIG. 17 shows a perspective view of the connected electrical connections between two machine walls.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | | | |
|---|---|---|---|
| 20 | machine walls | 21 | foundation |
| 22 | installed wall | 30 | header |
| 31 | middle stud | 32 | cut-out |
| 33 | footer/bottom plate | 34 | rod |
| 35 | plug | 36 | expanding wedge |
| 37 | coupling rod | 38 | one-way couple |
| 39 | toothed rod | 40 | male side stud |
| 41 | male dovetail | 42 | gap |
| 43 | male sill | 44 | lock |
| 46 | male dovetail | 47 | female dovetail |
| 48 | ears | 49 | fastener |
| 50 | female side stud | 53 | female sill |
| 54 | sill receiver opening | 55 | flashing |
| 56 | base | 60 | plumbing |
| 61 | side tube | 63 | end coupler |
| 62 | coupler | 70 | bottom flashing |
| 64 | plumbing tube | 72 | flashing lip |
| 71 | hold-down tube | 74 | central opening |
| 73 | flashing bottom | 76 | post |
| 75 | anker | 79 | hole |
| 77 | socket | 81 | expanding receiver |
| 80 | receiver | 85 | flange |
| 84 | hole | 87 | tube |
| 86 | ledges | 89 | in or out |
| 88 | move | 91 | install |
| 90 | down | 93 | tension |
| 92 | down | 95 | insert |
| 94 | expanded | 97 | extend |
| 96 | open | 99 | stud spacing |
| 98 | lift spacing | 101 | conductor(s) |
| 100 | conduit | 103 | rotate |
| 102 | turn | 111 | fastener |
| 110 | break jaw box | 113 | second break jaw |
| 112 | first break jaw | 115 | first insulating divider |
| 114 | third break jaw | 120 | male post |
| 116 | second insulating divider | 122 | flange |
| 121 | cylinder wall | 124 | teeth |
| 123 | hole | 126 | hinge |
| 125 | lever | 131 | shaft |
| 130 | knife blade box | 133 | barrel |
| 132 | fastener | 135 | insulator |
| 134 | blade | 137 | spring |
| 136 | key | | |

Figure 1:
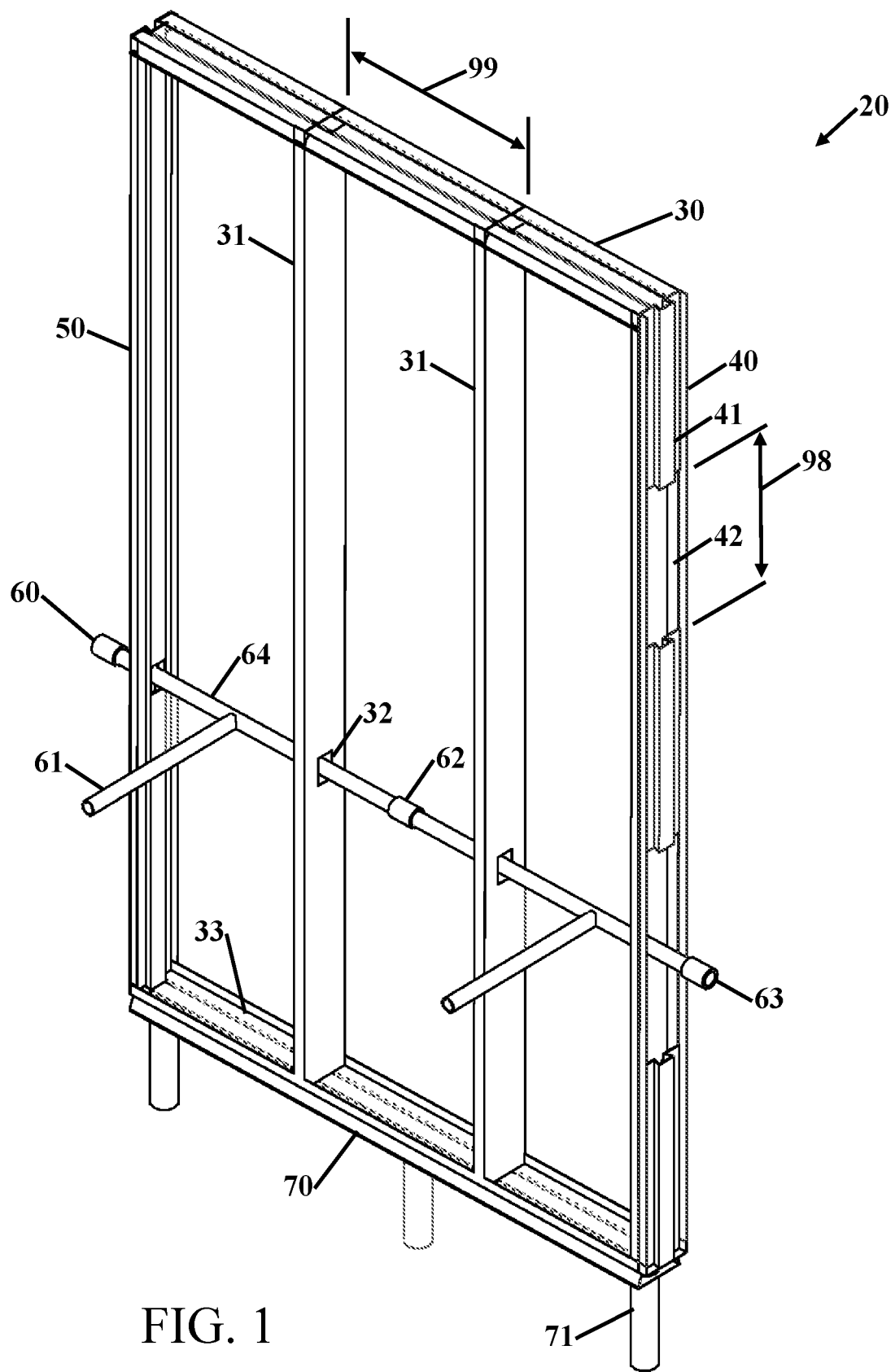
FIG. 1 shows a perspective view of a machine walls with the interior and exterior surfaces removed.

FIG. 1 shows a perspective view of a machine walls 20 with the interior and exterior surfaces removed. While this figure shows both the interior and the exterior wall surfaces removed, it is contemplated that the wall section can be installed with at least one outside substrate surface on the machine walls 20. When the outside substrate surface is installed, flashing of adjacent panels is needed or a secondary sealing operation is needed. An advantage for this type of installation is that the installer can perform all of the joining of the plumbing and electrical conduits from within the building or house.

The outside surface would be typically installed, but a finished interior surface that is covered with drywall or sheetrock could equally be covering one-side of the modular wall 20. The operation(s) to connect the electrical and plumbing lines together is then performed from the outside of the building or house. From the inside surface the drywall or sheetrock can be spackled textured and painted. An advantage of this type of installation is that the openings for the electrical junction boxes and plumbing can be pre-cut into the drywall or sheetrock.

In this preferred embodiment the machine walls 20 section is 48 inches in width to accommodate a common width of drywall or sheetrock, but other widths are contemplated from 16 to 96 inches or per industry standards. It should be understood that the width can also be shorter than 16 inches and longer than 96 inches depending upon the design requirements. This embodiment also shows the middle stud (s) 31 with stud spacing 99 at 16 inches on-center, but can also be 12 or 24 inches depending upon the design requirement(s).

The machine walls 20 can be constructed with 2×4 or 2×6 header 30, middle studs 31 and footer 33, or other dimensions, again as dictated by the design requirements. The stud members can be from wood, metal or other structurally capable material for the studs. Preformed concrete and structural steel wall panels are also embedded with interlocking mechanism shows and described herein. The outside vertical studs have a male side stud 40 with a male dovetail 41 and a female side stud 50 with a complementary female dovetail (not shown in this figure). The opposing dovetails allow the modular wall 20 sections to be quickly assembled by lifting a (second) new wall section onto a first secured wall section of the machine walls 20. It is contemplated that the modular walls can include a side vertical slip correction for a wall-to-wall connection system option. Minor labor and lift are required to set the wall system into place as the vertical channel openings are oriented in such a way as to allow for the required structural strength (Typically 16" on center). The dovetails can be designed with an optional taper at the base of each connection to tighten the connection as it slides into place. Due to the potential lack of ceiling clearance in the system, the base mechanical lock system can also be utilized on the side edge of the system to eliminate the need to lift the panel system when necessary.

The side have dovetail connections that are tapered. The dovetails are spaced to have a gap 42 of between 3 and 18 inches on center to reduce the lift spacing 98 height that one section must be lifted to engage in an adjoining wall section(s), but can be greater than 18 inches or less than 3 inches, the distance between the dovetail connections can be adjusted to meet structural requirements and/or local building code requirements. The taper provides a loose fit when the dovetail starts to enter the dovetail slot and a tight secure engagement as the dovetail tapers at the bottom. The bottom of the modular wall 20 shows a bottom flashing 70 with hold-down tubes 71 for earthquake or hurricane protection. There can be a mechanical pressure actuating snap lock connection at the base of the wall system which allows for a quick lock in place installation process. The bottom flashing 70 or sill plate and hold-down tubes 71 will be shown and described in other figures herein.

The vertical studs are shown with a cut-out 32 where the plumbing tube 64 passes through the machine walls 20. While this example shows just a single plumbing tube 64 the machine walls 20 would have a hot water line a cold-water line and a line for electrical connections. In this figure only one plumbing tube 64 line is shown for clarity and simplicity. There is a first tube 60 and an end coupler 63 that connects to adjacent modular wall 20 sections. A side tube 61 connects to the plumbing tube 64 for a rough plumbing connection for a sink, toilet, shower, hose bib or the like. An expandable couple 62 allows the plumbing tube 64 to be expanded or contracted to connect to other modular wall 20 sections.

The electrical and/or plumbing connections that join modular walls to be connected and sealed with bonding agents, push, spin lock or frictional lock to provide a secure sealed system where the installer can quickly make connections between the modular walls. This is contemplated to be a one-way locking or rotation system as a cam or tab that bends and flexes back into position after the wall section is fully inserted but may also include an access door or hole to release the lock to remove the wall section.

Figures 2, 3:
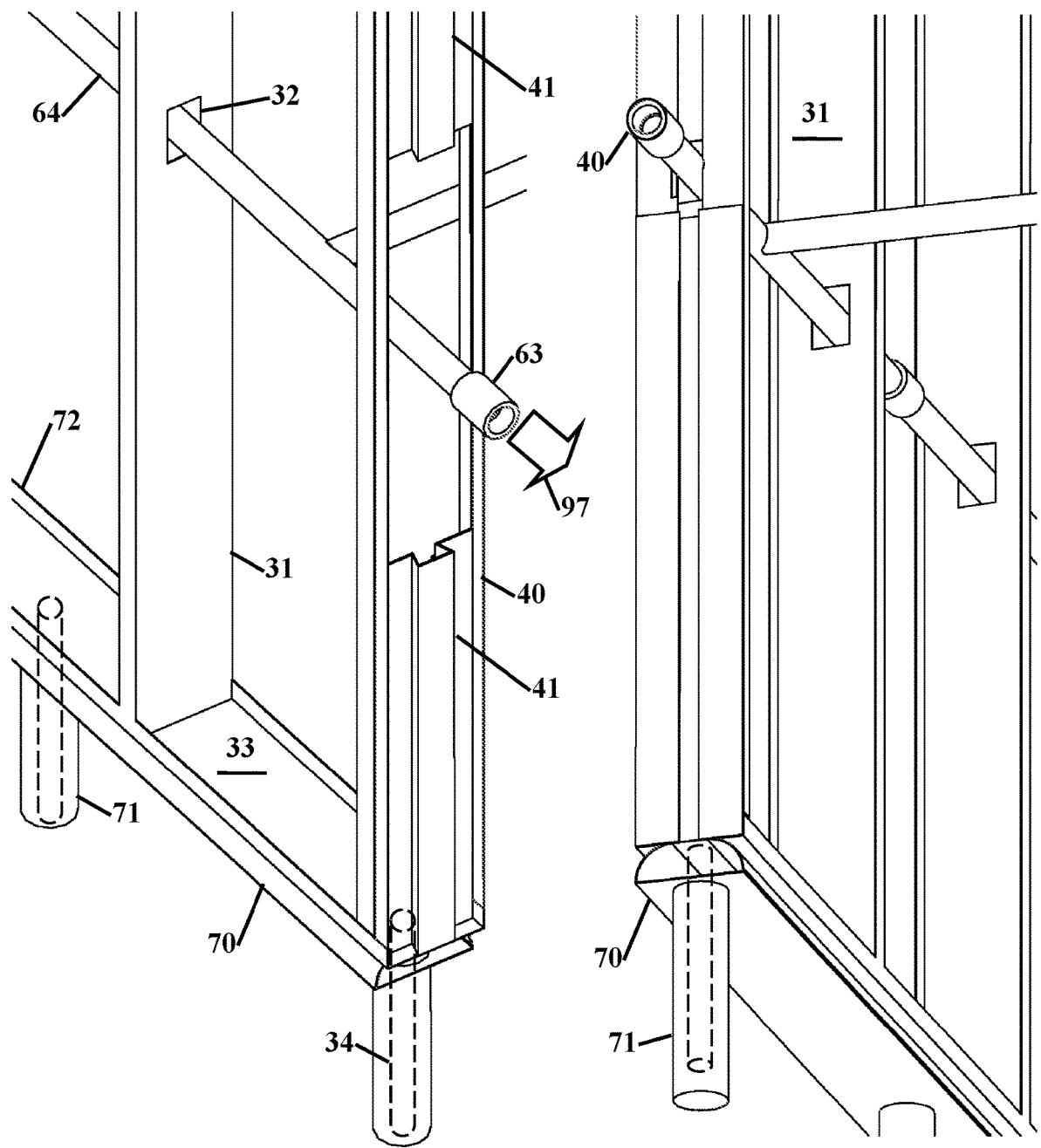
FIG. 2 shows a perspective view of a male side of the modular wall.
FIG. 3 shows a perspective view of a female side of the modular wall/

FIG. 2 shows a perspective view of a male side of the modular wall and FIG. 3 shows a perspective view of a female side of the modular wall. In these figures you can see the opposing sides of the modular wall with the footer 33 in the bottom flashing 70. The hold-down tube 71 is shown extending out the bottom of the bottom flashing 70. The footer has a rod 34 that is secured or bonded into each hold-down tube 71 to secure the modular wall section into the bottom flashing 70. The rod can be threaded, studded or an expandable bold that grips the hold-down tube 71. A lip 72 of the bottom flashing 70 can be seen extending up one or more sides of the footer 33.

Middle stud(s) 31 are seen in these views inside of the male side stud 40 with the male dovetail 41. The cut-out 32 provides clearance for plumbing tube 64 and/or electrical tubes that can run through the modular wall(s). The end coupler 63 can extend 97 to connect plumbing and/or electrical to multiple modular walls.

Figure 4:
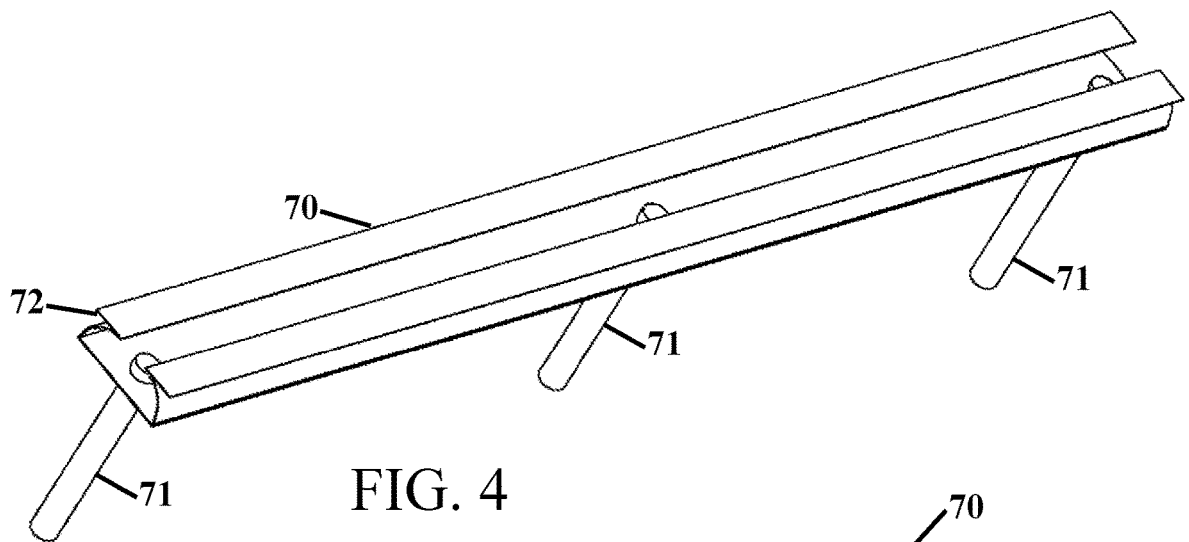
FIG. 4 shows a foundation flashing.
Figure 5:
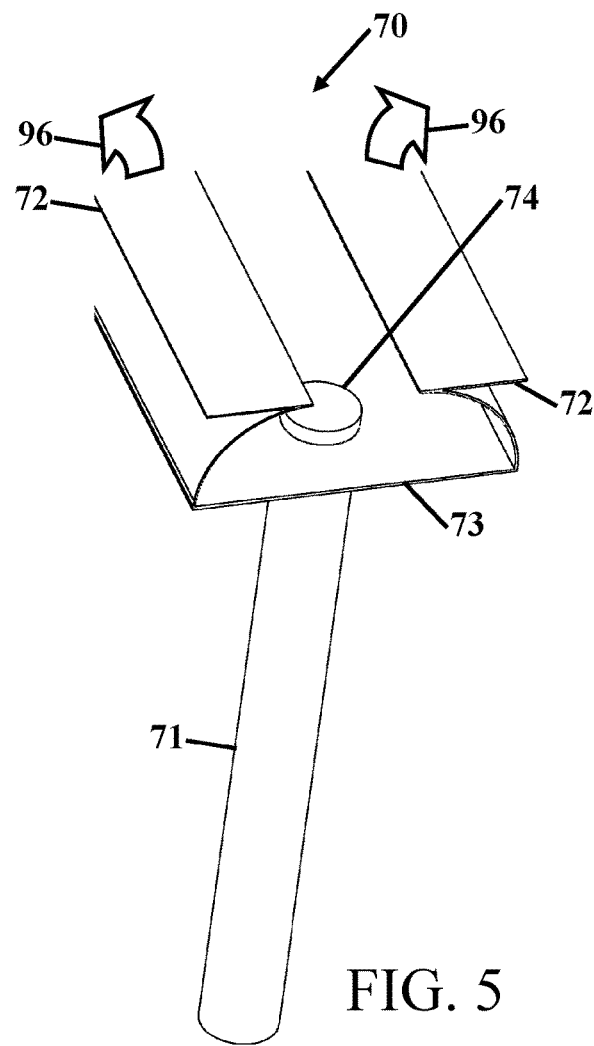
FIG. 5 shows an end detail view of the foundation flashing.

FIG. 4 shows a foundation flashing and FIG. 5 shows an end detail view of the foundation flashing. It is contemplated that the bottom flashing 70 or sill plate can be cast or set into the foundation. The flashing bottom 73 is joined or sealed with the foundation. The bottom of the hold-down tube 71 can have one or more horizontally or vertically joined plates that further secure the bottom flashing 70 or sill plate into the foundation. One or more sides of the bottom flashing 70 can have flashing lip(s) 72 that can extend along the bottom of the footer that is not shown in this figure and can open 96 or flex to seal the bottom flashing 70 to the footer. The hold-down tube 71 has a central opening 74 that accepts and joins to the rod that extends from the bottom of the footer.

An advantage of counter flashing vertical legs that are built into the subsurface or foundation is for a waterproofing process at the base of the wall system, there is a vertical lip built into the subsurface locking channel that allows for a full counter flashed connection when the wall panel that is set in place.

Wall system has built in sensors for unmanned, autonomous or remotely controlled delivery systems, it allows for 2-point fulcrum setting capabilities (wall can be set initially manually). Each panel can have a GPS sensor and/or a RFID tag to identify the panel and where each panel is positioned, located and secured. This will eliminate assembly errors and will allow the building or house to quickly assembled with high precision.

While the panels are shown as solid wall panels it is contemplated that the wall panels can be fabricated and installed with openings for windows and/or doors. It is also contemplated that the window frames or window frame with glass can be installed or pre-installed on the machine walls 20.

Figure 6:
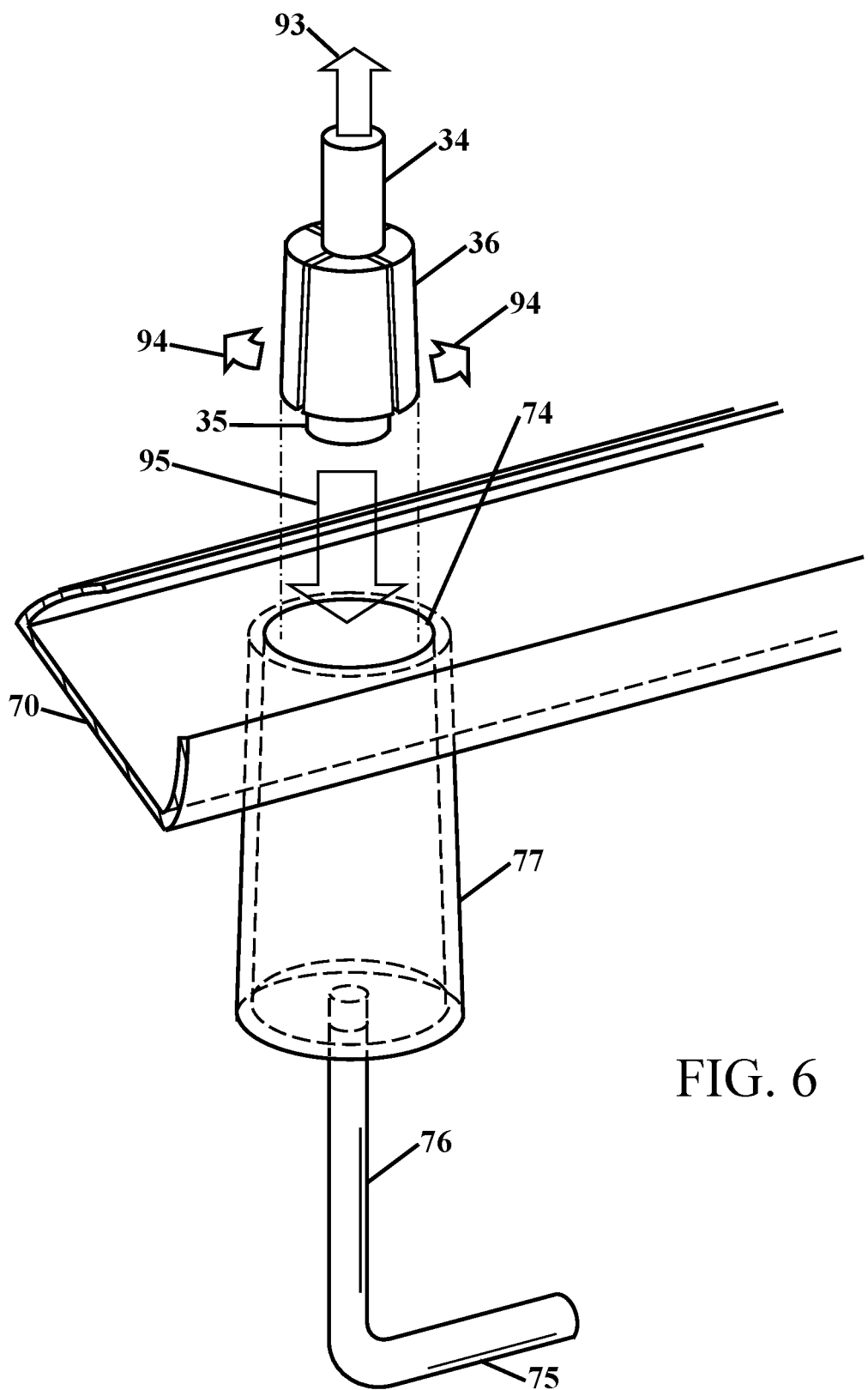
FIG. 6 shows a perspective view of anchoring the machine walls to the bottom flashing hold down.

FIG. 6 shows a perspective view of anchoring the machine walls to the bottom flashing hold down. In this embodiment the bottom flashing 70 has a socket 77 secured to the bottom. The socket 77 has a post 76 with a bent anker 75. These components are cemented or cast into the foundation. This provides a secure system in the foundation. The socket 77 is tapered, and the taper further secures the socket within the foundation of the building. The socket 77 has a central opening 74 that accepts an expanding wedge 36 that is secured to the bottom of the rod 34 that is on the footer (not shown).

When the machine walls are being assembled, the expanding wedge 36 is inserted 95 through the central opening 74 and is expanded 94 to pull and set the machine walls in the foundation. The expanding wedge 36 can be expanded by creating tension 93 as a plug 35 is withdrawn into the expanding wedge 36. It is also contemplated that the expanding wedge 36 can be automatically expanded with internal springs when the plug contacts the bottom of the socket. This does not require any tools for operation and the springs will both pull the expanding wedge 36 into the socket 77 and any downward force on the rod 34 will further secure the expanding wedge 36 within the socket 77. It is contemplated that the machine walls can be assembled with robots or automation.

Figure 7:
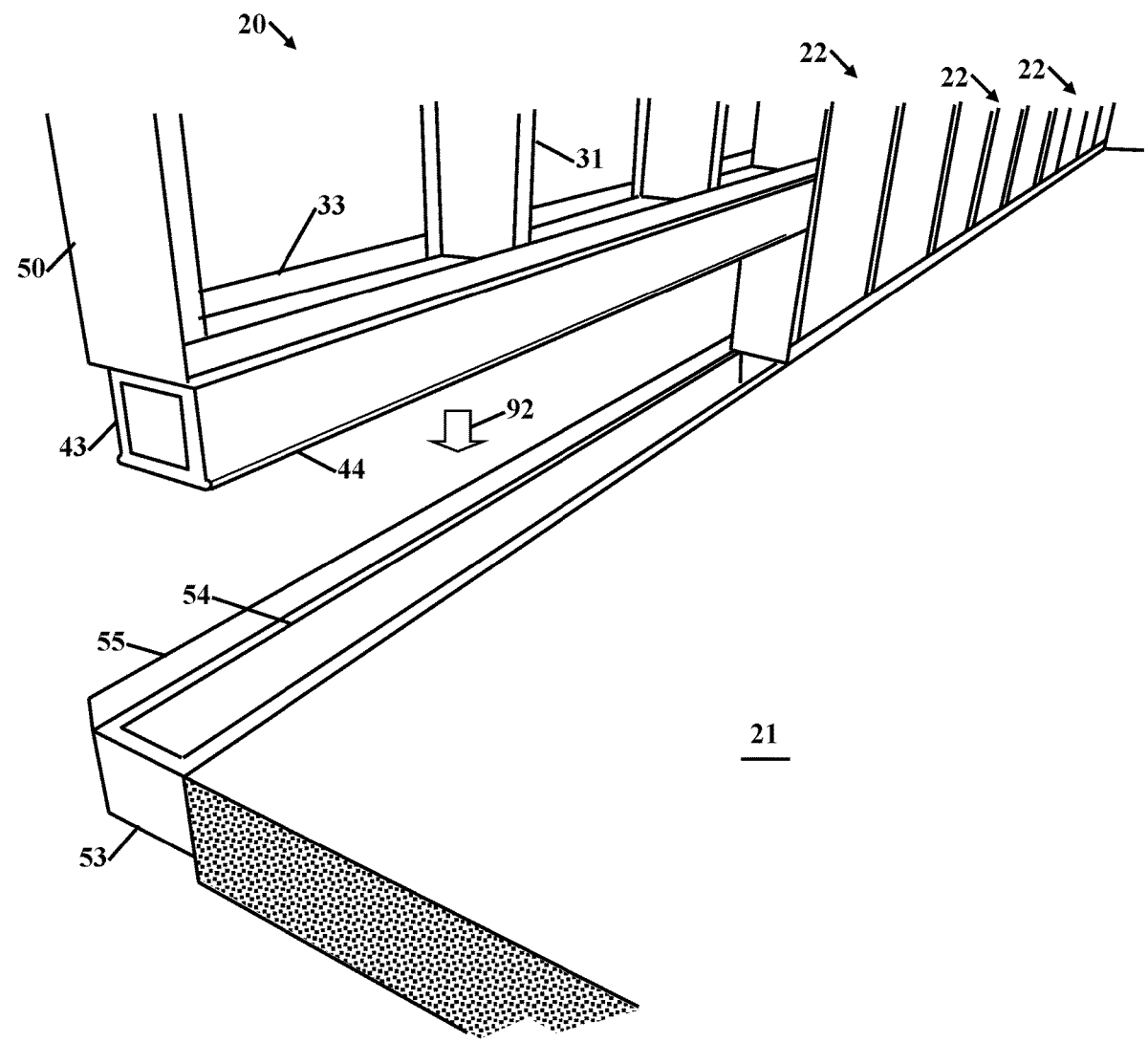
FIG. 7 shows an exploded perspective view of the foundation, sill and footer with the insulating flashing.

FIG. 7 shows an exploded perspective view of the foundation 21, and footer 33 with the insulating flashing 55. In this figure three installed walls 22 are shown, and a machine wall 20 is being brought down 92. The vertical studs and middle stud 31 are secured to the footer/bottom plate 33. It is also contemplated that the wall can be a solid construction without internal studs. The footer/bottom plate 33 is secured to a male sill 43 box. The male sill 43 box has a bottom lock 44. The male sill 43 box is pushed down 92 into a female sill 53 box that has a sill receiver opening 54 for the male sill 43 box. In the bottom of the female sill 53 box is a retainer that locks onto the lock 44 in the male sill 43 box. When the two parts are engaged together the female sill 53 box has a flashing 55 that prevents water intrusion into the machine wall frame. The flashing 55 can also be configured for finishing materials such as, but not limited to, stucco, block, wood siding or shingles.

Figure 8:
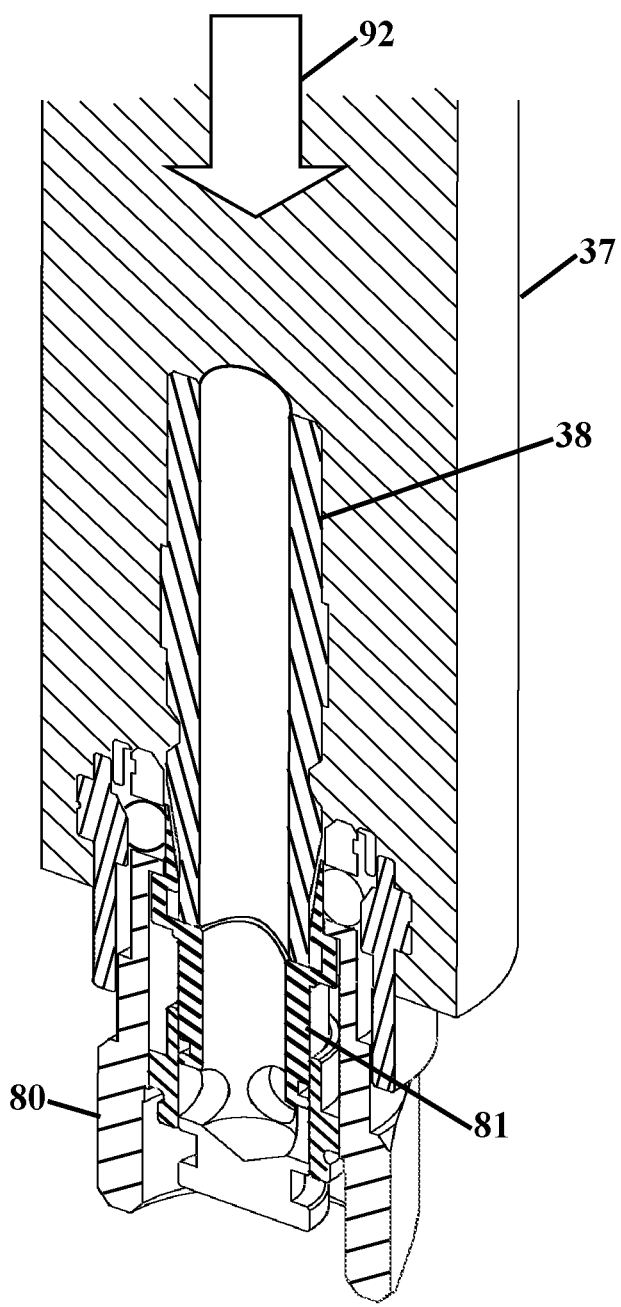
FIG. 8 shows a perspective view of another preferred embodiment of an anchoring the machine walls to the bottom flashing hold down.

FIG. 8 shows a perspective view of another preferred embodiment of an anchoring the machine walls to the bottom flashing hold down. In this embodiment there is a coupling rod 37 with a one-way coupling 38 that snaps into a receiver 80. The expanding receiver 81 uses spring loaded balls, pins or tapered latches or locks onto the one-way coupling 38 when the coupling rod 37 is pressed down 92. This locks the machine wall into the foundation without the need for secondary operations like threading a nut onto a rod or nailing the footer into a sill or foundation.

Figure 9:
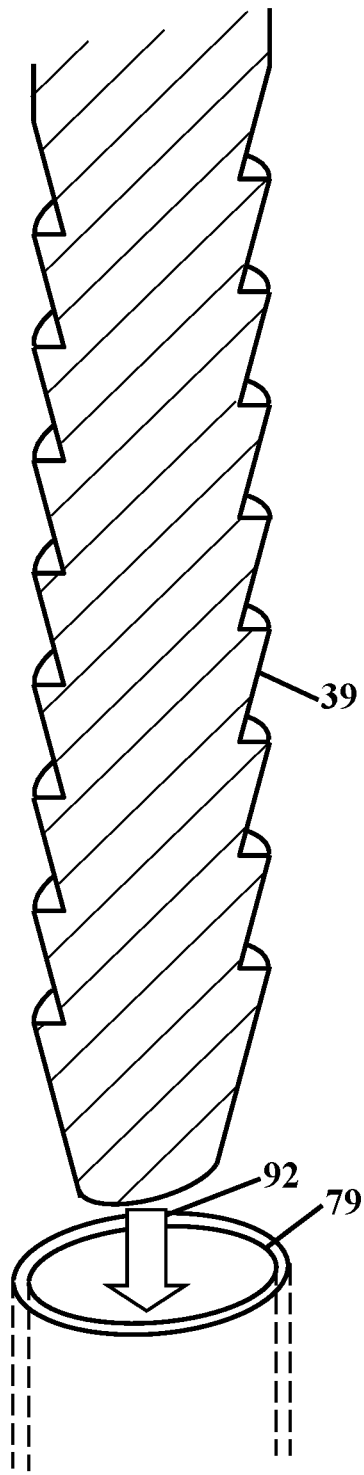
FIG. 9 shows a perspective view of another preferred embodiment of an anchoring the machine walls to the bottom flashing hold down.

FIG. 9 shows a perspective view of another preferred embodiment of an anchoring the machine walls to the bottom flashing hold down. This embodiment uses angled teeth on a toothed rod 39. The toothed rod 39 is pressed or driven down 92 into a hole in the foundation. The teeth grip into the hole 79 and adhesives may also be added into the hole 79 or onto the teeth to bond the toothed rod 39 into the hole 79.

Figure 10:
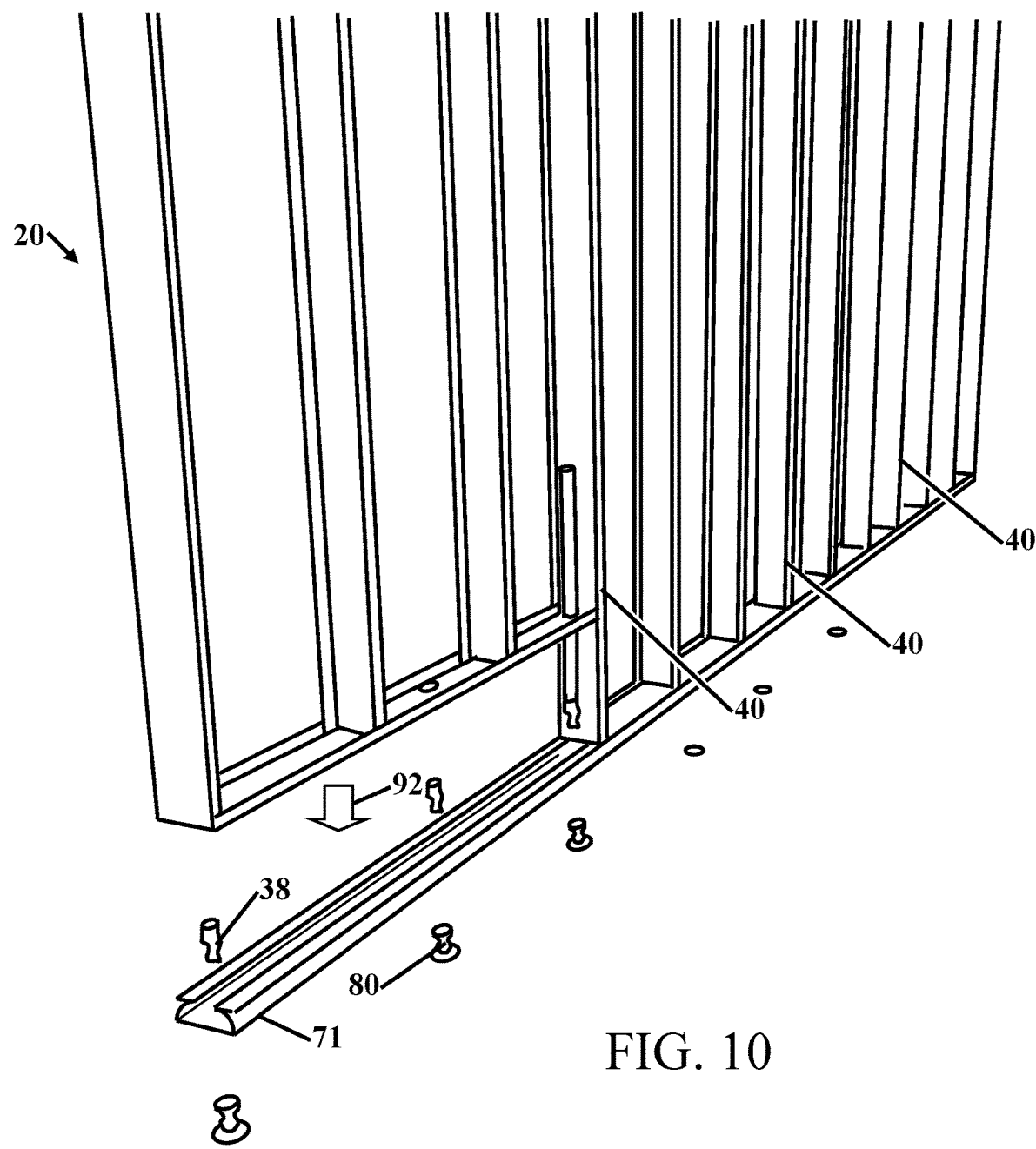
FIG. 10 shows a perspective view of the machine wall being assembled.

FIG. 10 shows a perspective view of the machine wall 20 being assembled. This figure shows multiple male side studs 40 with three installed and secured machine walls 20 and a fourth machine wall 20 being lowered down 92 into position. The bottom of each coupling rod 37 is a one-way coupling 38. Within the hold-down tube(s) 71 is a receiver 80 that connects and secures the machine wall 20 when the machine wall 20 brought into position. This is completed without any secondary tightening or securing of additional hardware.

Figure 11:
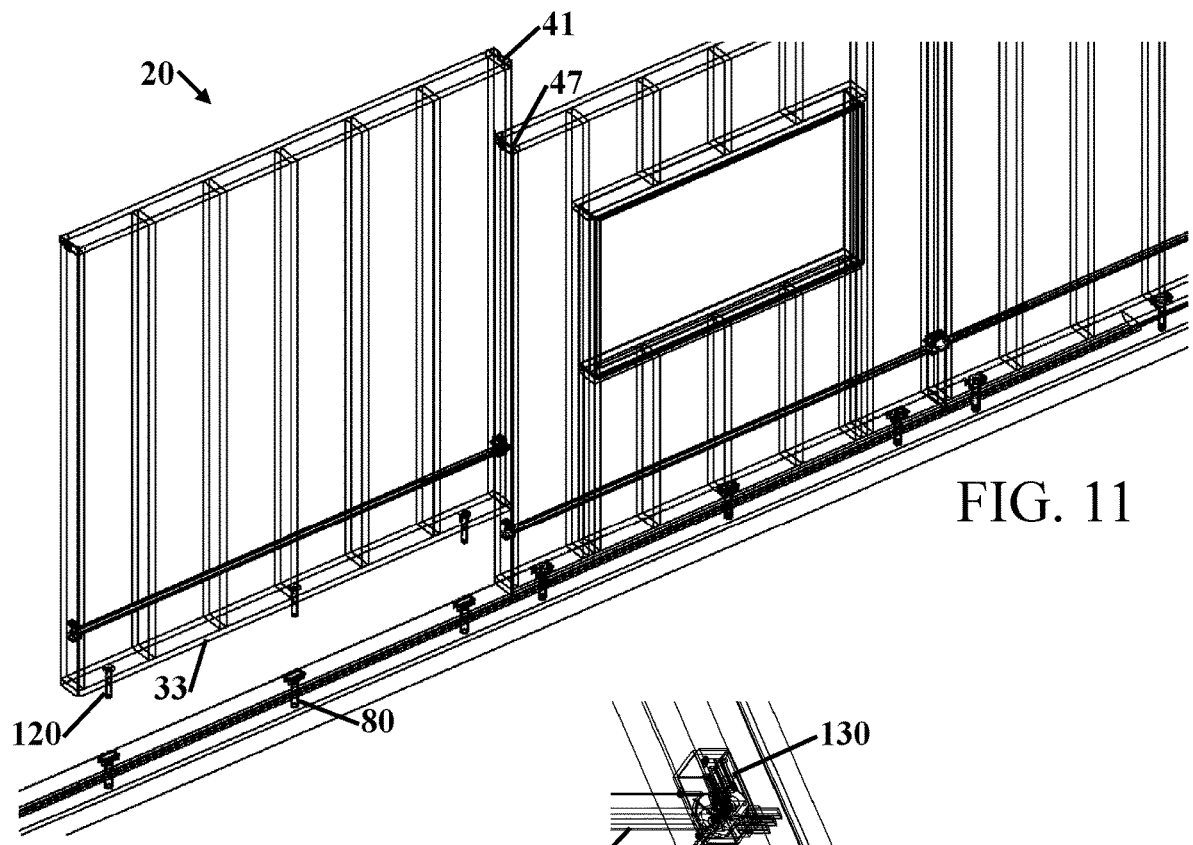
FIG. 11 shows a perspective wire frame view of a machine wall with dovetail fittings, electrical connections and a one-way anchoring system.
Figure 12:
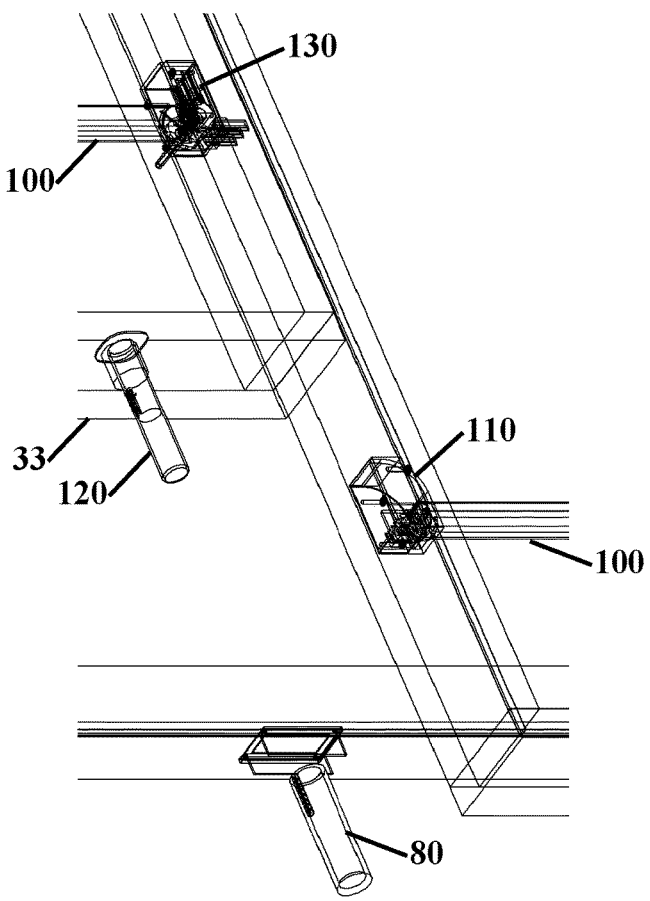
FIG. 12 shows a perspective wire frame view of a machine wall with the electrical connections and a one-way anchoring system.

FIG. 11 shows a perspective wire frame view of a machine wall 20 with dovetail fittings, electrical connections and a one-way anchoring system and FIG. 12 shows a perspective wire frame view of a machine wall 20 with the electrical connections and a one-way anchoring system. These figures show the machine wall 20 with an alternative securing system and an electrical connection that joins adjacent machine walls 20. At the top of the machine walls 20 are interconnecting dovetail fittings with the secured wall having a female dovetail 47 and machine wall 20 that is being installed having a male dovetail 40.

The foundation has a plurality of receivers 80 that accept male posts 120 that extend from the bottom of the footer/bottom plate 33 on each machine wall 20. Upon installation the male posts 120 are inserted into the receiver(s) 80 and "tapped" down to secure the male post(s) 120. Each machine wall 20 section can be quickly set and locked into position. In FIG. 11, a section is shown with a window. Each machine wall 20 section is pre-fabricated with all of the doors, windows or other characteristic when the machine wall 20 is fabricated. Upon installation the machine wall 20 sections are anchored according to the assembly order and instruction. After securing the machine wall 20, the electrical (and/or plumbing) connections are aligned. In these figures the conduit 100 in each machine wall 20 section includes a break jaw box 110 and a knife blade box 130. Further figures and description of the interconnection is shown and described in other figures herein.

Figure 13:
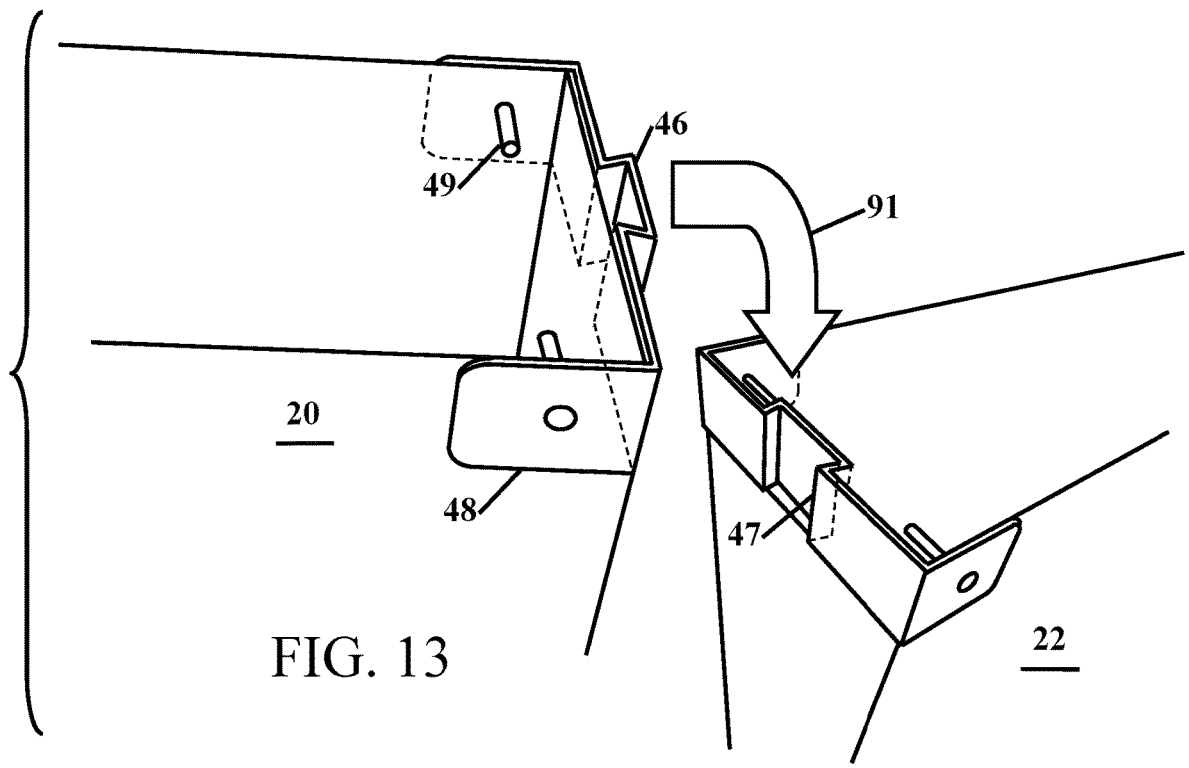
FIG. 13 shows a perspective view of both sides of the dovetail fittings at one end of each wall.

FIG. 13 shows a perspective view of both sides of the dovetail fittings at one end of each wall. On the right side of this figures is an installed wall 22, and on the left side of this figure is a machine wall 20 that is being installed. The installed wall 22 has a female dovetail 47, while the machine wall 20 being installed has a male dovetail 46. While this figure shows the walls being aligned in a linear arrangement the wall being installed could be placed at a 90-degree angle or at another angle where the machine wall 20 being installed has the male dovetail 46 set at a desired angle to mate with the female dovetail 47. The female dovetail 47 is recessed into the wall a mating while the male dovetail 46 is set outside of the flush end surface of the wall. Each male dovetail 46 and female dovetail 47 is a bracket having ears 48 and is secured to the respective side of the machine wall with faster (s) 49.

The wall being installed is simply lifted onto the installed machine wall 22 to engage the dovetail surfaces. While only one dovetail connection is shown, multiple dovetail connections can exist along the height of the wall edge to provide multiple securing locations based upon building code. It is also contemplated to include a lateral adjustment track is indicated in image 18. This allow the male stud to be adjustable if necessary, to line the male and female studs up when needed.

Figure 14:
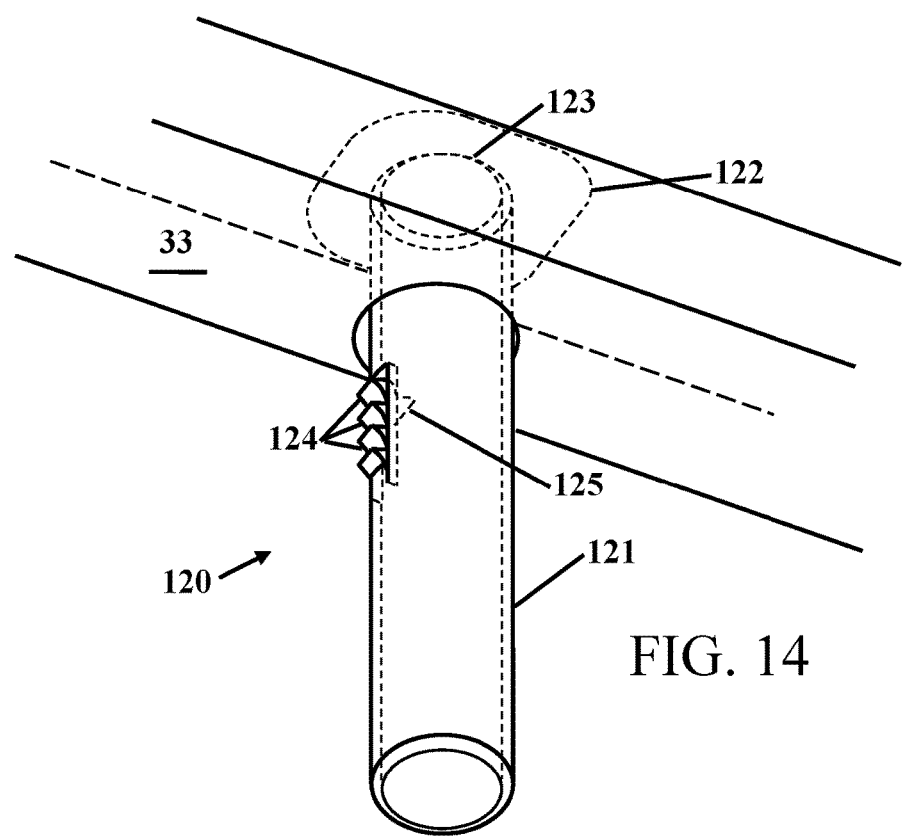
FIG. 14 shows a perspective view of the one-way anchoring system on the bottom of a wall section.

FIG. 14 shows a perspective view of the one-way anchoring system on the bottom of a wall section, FIG. 15 shows a perspective view of the one-way anchoring system with both the male post 120 and the female receiver 80 connections. When the foundation (or floor) is poured or set the receiver(s) 80 are set, cast or poured. A flange 85 base or foundation template can be used to locate and retain the receiver(s) 80 in place in the base 56 or foundation. The flange 85 can remain or be removed and reused. The flange 85 base creates a pre-set distance between concrete embed inserts for a high level of accuracy of required to space the concrete embed inserts for installation of the wall panel system. Each receiver 80 has hole 84 in a tube 87 that accepts a male post 120 that extends out the bottom of the machine wall. On one (or more) side of the inside of the tube 87 has a plurality of ledges 86 or teeth. The ledges 86 or teeth are configured to engage with teeth 124 in the male post 120.

The male post 120 extends through a hole from the bottom of the footer 33 on the machine wall section(s). A flange 122 holds the footer 33 into the receiver 80. A hole 123 in the flange 122 is the interior of the cylindrical wall 121 of the tube that forms the male post 120. The tube receiver can also be square, rectangular and composed of other practical shapes, The male post 120 has locking teeth 124 that engage in the ledges 86 within the tube 87. The teeth 124 exist on a hinge 126 that allows the teeth 124 to flex and move 88 in and out 89 as the teeth ratch into the ledges 86. While a particular number of teeth 124 and ledges 86 are shown, a different number of teeth 124 and ledges 86 can be used along with locating the teeth 124 and ledges in multiple locations or locating the ledges 86 around the interior of the tube 87. The top of the flange 122 can be "struck" or pressure applied to drive and lock the machine wall onto the receiver 80. The locking teeth 124 components is further shown with a lever 125 that can be rotated or moved 88 to release the teeth 124 from the ledges 86 so the machine wall can be dis-assembled, repositioned or moved.

FIG. 16 shows a perspective view of both wall connections for the electrical connections between two machine walls and FIG. 17 shows a perspective view of the connected electrical connections between two machine walls. A time-consuming task with erecting a house is pulling electrical wiring through the wall studs. In the machine walls, electrical conduit 100 with internal conductors 101 are pre-installed within the machine walls. Each connection box is secured with fasteners 111 or 132. When the walls are installed each side of the wall sections have mating electrical connections that provide power through the wall sections. The installed wall section has a break jaw box 110 with the three electrical connection for a first break jaw 112, a second break jaw 113 and a third break jaw 114 that connect to the hot, neutral and ground electrical wiring. A first insulating divider 115 and a second insulating divider 166 ensure electrical isolation between the conductors.

With the knife blade box 130 the conductors 101 enter a rotatable barrel 133 having an insulator 135 where each conductor 101 connects to a separate blade(s) 134. The barrel 133 rotated 103 to move the blade(s) 134 from a vertical position to a horizontal position. A spring 137 biases the rotation of the blades 134 to maintain the position of the blades 134. In the horizontal position the blades (134) engage into their respective break jaw 112-114. A key 136 or shaft 131 is inserted into the barrel 133 to turn 102 the shaft 131 and or barrel 133 with a key to engage (or disengage) the electrical connection between adjacent machine walls.

Thus, specific embodiments of modular walls used to construct a building have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A machine wall comprising:
a bottom plate footer;
a wall section having a foundation;
said foundation includes a female receiver means that has locking teeth for securing said bottom plate footer to said foundation;
a foundation template that is configured to hold the female receiver means in place while concrete is being poured;
said bottom plate footer includes at least one vertical male stud and at least one vertical female stud receiver;
said at least one vertical male stud and said at least one vertical female stud receiver has complementary dovetail or hook connections at opposing outside surfaces of said at least one vertical male stud and said at least one vertical female stud receiver, respectively;
at least one header secured to a top of said at least one vertical male stud and said at least one vertical female stud receiver, and
at least one plumbing conduit or at least one electrical conduit or circuit that passes through said at least one vertical male stud and said at least one vertical female stud receiver and extends out of at least one of said at least one vertical male stud and said at least one vertical female stud receiver.

2. The machine wall according to claim 1, wherein said at least one vertical male stud and said at least one vertical female stud receiver have one side of said complementary dovetail or hook connection for securing a second machine wall.

3. The machine wall according to claim 1, wherein said bottom plate footer has at least two earthquake or hurricane hold-downs.

4. The machine wall according to claim 1, a bottom of said bottom plate footer includes a one-way anchoring system means for engagement into said foundation.

5. The machine wall according to claim 1, wherein a connection of said bottom plate footer to said foundation has counter flashing at a concrete insert.

6. The machine wall according to claim 1, further includes a global position sensor (GPS) that identifies a position and a location where said bottom plate footer is placed on a said foundation.

7. The machine wall according to claim 1, wherein said at least one plumbing conduit or said at least one electrical conduit or circuit joins to a second plumbing conduit or a second electrical conduit or circuit with a bonding agent, a push, a spin lock or a frictional lock to provide a secure sealed system.

8. The machine wall according to claim 1, further includes a bottom flashing that is secured to said foundation and said bottom plate footer further includes a retaining means for securing said bottom plate footer to said bottom flashing.

9. The machine wall according to claim 1, wherein said electrical conduit circuit further includes a plurality of connection blades or prongs.

10. The machine wall according to claim 9, wherein said plurality of connection blades are mounted to a rotatable barrel whereby said plurality of connection blades are configured to connect into a plurality of break jaws.

11. The machine wall according to claim 10, further includes a spring that biases the rotation of the plurality of connection blades to maintain a position and electrical connection of the plurality of connection blades.

12. The machine wall according to claim 10, wherein said least one vertical female stud receiver has said plurality of break jaws and said at least one vertical male stud has said plurality of connection blades.

13. The machine wall according to claim 10, wherein said rotatable barrel electrically connects said plurality of connection blades to conductors within said at least one electrical conduit.

14. The machine wall according to claim 13, further includes a shaft or key that is configured to rotate said rotatable barrel.

15. The machine wall according to claim 1, wherein said bottom plate footer includes a male post that is configured to engage into said female receiver.

16. The machine wall according to claim 15, wherein said male post has at least one tooth that is configured to engage in said locking teeth of said female receiver.

17. The machine wall according to claim 16, wherein the at least one tooth is connected with a flexing hinge on said male post.

18. The machine wall according to claim 17, wherein said flexing hinge further includes a lever tab whereby said at least one tooth can be dis-engaged from said locking teeth.

* * * * *